(12) United States Patent
Iwano et al.

(10) Patent No.: US 9,162,554 B2
(45) Date of Patent: Oct. 20, 2015

(54) VEHICLE REAR DOOR STRUCTURE

(75) Inventors: Yoshihiro Iwano, Toyota (JP); Kosuke Ebina, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/131,743

(22) PCT Filed: Jun. 26, 2012

(86) PCT No.: PCT/JP2012/066273
§ 371 (c)(1),
(2), (4) Date: Jan. 9, 2014

(87) PCT Pub. No.: WO2013/018470
PCT Pub. Date: Feb. 7, 2013

(65) Prior Publication Data
US 2014/0167446 A1  Jun. 19, 2014

(30) Foreign Application Priority Data
Aug. 1, 2011 (JP) .................................. 2011-168832

(51) Int. Cl.
*B60J 5/10*  (2006.01)
(52) U.S. Cl.
CPC . *B60J 5/106* (2013.01); *B60J 5/107* (2013.01)
(58) Field of Classification Search
CPC ................................ B60J 5/107; B60J 5/106
USPC ................. 296/146.1, 146.8, 146.6, 146.5
See application file for complete search history.

(56) References Cited

U.S. PATENT DOCUMENTS 7,537,267 B2* 5/2009 Tanaka et al. ............... 296/146.6
2011/0074179 A1* 3/2011 Kuntze et al. ............... 296/146.6

FOREIGN PATENT DOCUMENTS

| CN | 2740735 Y | 11/2005 |
| CN | 101008307 A | 8/2007 |
| EP | 1813454 A2 | 8/2007 |
| JP | A 10-100684 | 4/1998 |
| JP | A 2007-145118 | 6/2007 |
| JP | A 2010-254276 | 11/2010 |
| JP | A 2011-168175 | 9/2011 |
| JP | A 2012-131374 | 7/2012 |
| JP | A 2012-131375 | 7/2012 |
| JP | A 2013-82235 | 5/2013 |
| JP | A 2013-82361 | 5/2013 |

* cited by examiner

*Primary Examiner* — Joseph D Pape
*Assistant Examiner* — Dana Ivey
(74) *Attorney, Agent, or Firm* — Oliff PLC

(57) ABSTRACT

To obtain a vehicle rear door structure that can improve a fitting performance of a rear door. A pair of connecting beads, that connect a lock mechanism placement portion with regions positioned at vehicle transverse direction outer sides with respect to a lateral bead, are formed at a rear door inner panel. Upper end portions of the connecting beads are disposed at positions apart from the lateral bead and are connected to an annular bead, and have outer side wall portions and inner side wall portions, that stand erect in a door thickness direction of a rear door. The outer side wall portions and the inner side wall portions both extend in a direction orthogonal to an extension line of the lateral bead as seen in a door elevation view. Further, the outer side wall portions are made integral with an inner peripheral wall portion of the annular bead.

18 Claims, 6 Drawing Sheets

VEHICLE REAR DOOR STRUCTURE

TECHNICAL FIELD

The present invention relates to a vehicle rear door structure that is applied to a door at a rear portion of a vehicle.

BACKGROUND ART

A vehicle rear door is structured to include an outer panel and an inner panel (see Japanese Patent Application Laid-Open (JP-A) No. 10-100684, for example). In the state in which the rear door is closed, a door lower end portion is pulled-in toward a vehicle front side and is locked while a vertical direction intermediate portion receives urging force substantially toward a vehicle rear side by dampers.

PRIOR ART DOCUMENTS

Japanese Patent Application Laid-Open (JP-A) No. 10-100684

SUMMARY OF INVENTION

Technical Problem

However, in such a structure, when the rigidity of the inner panel deteriorates due to work holes or the like that are formed in the inner panel, the fitting performance of the rear door is affected.

In consideration of the above-described circumstances, a subject of the present invention is to provide a vehicle rear door structure that can improve the fitting performance of a rear door.

Solution Addressing to Subject

A vehicle rear door structure relating to a first aspect of the present invention has: a rear door that opens and closes a rear door opening portion of a vehicle rear portion, and that is structured to include an outer panel and an inner panel that are disposed so as to face one another and are joined together, an upper end portion of the rear door is mounted to a vehicle body upper portion by door hinges, and an intermediate portion in a vehicle transverse direction of a lower end portion of the rear door is anchored to a vehicle body lower portion by a door lock mechanism, and, in a closed state, both end portions in the vehicle transverse direction of a vertical direction intermediate portion of the rear door are urged substantially toward a vehicle rear side by dampers; an annular bead that is formed so as to circle an outer peripheral portion of the inner panel; a lateral bead that is formed at an intermediate portion in a vertical direction of the inner panel and extends in the vehicle transverse direction, and whose outer side end portions in the vehicle transverse direction are disposed at positions that are apart from the annular bead; and connecting beads that connect regions, that are formed at the inner panel and are positioned at outer sides in the vehicle transverse direction with respect to the lateral bead, with a region at which the door lock mechanism is disposed. Upper end portions of the connecting beads, that are positioned at outer sides in the vehicle transverse direction with respect to the lateral bead, are disposed at positions that are apart from at least one of the lateral bead or the annular bead, and the connecting beads have side wall portions that stand erect in a door thickness direction of the rear door at side portions of the upper end portions.

In accordance with the vehicle rear door structure relating to the first aspect of the present invention, at the inner panel that structures the rear door, an annular bead is formed so as to circle the outer peripheral portion of the inner panel, and a lateral bead that extends in the vehicle transverse direction is formed at the intermediate portion in the vertical direction of the inner panel. Therefore, due to these, the torsional rigidity of the rear door overall improves, and the door operability at times of opening and closing the door is good.

Further, at the rear door, the upper end portion is mounted to the vehicle body upper portion by door hinges, and the vehicle transverse direction intermediate portion of the lower end portion is anchored to the vehicle body lower portion by the door lock mechanism, and, in the closed state, the both end portions in the vehicle transverse direction at the vertical direction intermediate portion are urged substantially toward the vehicle rear side by dampers. Therefore, in the closed state of the rear door, force that attempts to bendingly deform the inner panel in a sideways V-shape as seen in a vehicle side view is applied to the inner panel that structures the rear door.

With respect to this forth, at the inner panel, outer side end portions in the vehicle transverse direction of the lateral bead are disposed at positions that are apart from the annular bead, and the upper end portions of the connecting beads, that are positioned at outer sides in the vehicle transverse direction with respect to the lateral bead, are disposed at positions that are apart from at least one of the lateral bead or the annular bead. Therefore, although the lateral bead is formed, bending deformation which starts at the lateral bead as the bending point is not promoted. Namely, in the closed state of the rear door, regions in which no bead is provided between the beads at extended positions of the lateral bead contribute to the fitting rigidity of the rear door.

Further, the connecting beads formed at the inner panel connect the region where the door lock mechanism is disposed with regions positioned at the vehicle transverse direction outer sides with respect to the lateral bead, and side wall portions, that serve as the side portions of the upper end portions of the connecting beads, stand erect in the door thickness direction of the rear door. Therefore, the torsional rigidity of the rear door overall improves, and, even if force that attempts to bendingly deform the inner panel along the lateral bead is applied to the inner panel, sectional collapsing of the upper end portions of the connecting beads is suppressed, and bending deformation along the lateral bead of the inner panel is effectively suppressed. Due thereto, even if the lower end portion of the rear door is locked at a position in the vehicle body lower portion at which the lower end portion of the rear door is pulled-in toward the vehicle front side with a suppressed amount, positional offset of the rear door lower end portion in the vehicle longitudinal direction is suppressed, and the fitting of the rear door is realized well.

In a second aspect of the present invention, in the vehicle rear door structure relating to the first aspect, the upper end portions of the connecting beads are disposed at positions that are apart from the lateral bead, and the upper end portions have outer side wall portions that are connected to the annular bead, serve as the side wall portions, and stand erect in the door thickness direction of the rear door at outer side portions in the vehicle transverse direction of the upper end portions of the connecting beads, and the outer side wall portions are made integral with a wall portion of an inner peripheral side of the annular bead.

In accordance with the vehicle rear door structure relating to the second aspect of the present invention, the upper end portions of the connecting beads are disposed at positions that are apart from the lateral bead, and are connected to the annular bead. Therefore, some of the load that is applied to the connecting beads is shared by the annular bead. Further, the outer side wall portions, that stand erect in the door thickness direction of the rear door at the outer side portions in the vehicle transverse direction of the upper end portions of the connecting beads, are made integral with the wall portion at the inner peripheral side of the annular bead. Therefore, even if force that attempts to bendingly deform the inner panel along the lateral bead is applied to the inner panel, bending deformation of the inner panel is suppressed effectively as compared with, for example, a structure that does not have wall portions corresponding to the above-described outer side wall portions.

In a third aspect of the present invention, in the vehicle rear door structure relating to the first aspect or the second aspect, the side wall portions extend in a direction orthogonal to an extension line of the lateral bead as seen in a door elevation view.

In accordance with the vehicle rear door structure relating to the third aspect of the present invention, the side wall portions at the upper end portions of the connecting beads extend in a direction orthogonal to the extension line of the lateral bead in a door elevation view. Therefore, when force that attempts to bendingly deform the inner panel along the lateral bead is applied to the inner panel, the side wall portions can receive the inputted load in this direction of extension. Due thereto, collapsing-in of the side wall portions (in other words, sectional collapsing of the upper end portions of the connecting beads) is suppressed more effectively. Accordingly, bending deformation of the inner panel is suppressed more effectively by the side wall portions.

In a fourth aspect of the present invention, in the vehicle rear door structure relating to any one of the first aspect through the third aspect, the side wall portions are formed at side portions at both sides in the vehicle transverse direction of the upper end portions of the connecting beads.

In accordance with the vehicle rear door structure relating to the fourth aspect of the present invention, the side wall portions are formed at the side portions at the vehicle transverse direction both sides of the respective upper end portions of the connecting beads. Therefore, when force that attempts to bendingly deform the inner panel along the lateral bead is applied to the inner panel, the load is received at the pairs of side wall portions. Therefore, it is difficult for the inner panel to bendingly deform, as compared with a case in which side wall portions are formed only at a side portion at one side in the vehicle transverse direction.

In a fifth aspect of the present invention, in the vehicle rear door structure relating to any one of the first aspect through the fourth aspect, ribs, that extend in a direction orthogonal to a direction in which the connecting beads extend as seen in a door elevation view, are formed at the connecting beads.

In accordance with the vehicle rear door structure relating to the fifth aspect of the present invention, the ribs, that extend in a direction orthogonal to the direction in which the connecting beads extend as seen in a door elevation view, are formed at the connecting beads. Therefore, when load is applied to the connecting beads, it is more difficult for sectional collapsing of the connecting beads to occur. Thus, the reinforcing effect due to the connecting beads is exhibited properly.

Advantageous Effects of Invention

As described above, in accordance with the vehicle rear door structure relating to the first aspect of the present invention, there is the excellent effect that the fitting performance of the rear door can be improved.

In accordance with the vehicle rear door structure relating to the second aspect of the present invention, there is the excellent effect that, due to some of the load that is applied to the connecting beads being allotted to the annular bead, bending deformation of the inner panel can be suppressed effectively.

In accordance with the vehicle rear door structure relating to the third aspect of the present invention, there is the excellent effect that, by making the side wall portions at the upper end portions of the connecting beads be orthogonal to the extension line of the lateral bead in a door elevation view, bending deformation of the inner panel can be suppressed more effectively when force, that attempts to bendingly deform the inner panel along the lateral bead, is applied to the inner panel.

In accordance with the vehicle rear door structure relating to the fourth aspect of the present invention, there is the excellent effect that, by forming the side wall portions at the both side portions in the vehicle transverse direction of the respective upper end portions of the connecting beads, bending deformation of the inner panel can be suppressed more effectively when force, that attempts to bendingly deform the inner panel along the lateral bead, is applied to the inner panel.

In accordance with the vehicle rear door structure relating to the fifth aspect of the present invention, there is the excellent effect that, by forming the ribs at the connecting beads, bending deformation of the inner panel can be suppressed more effectively when force, that attempts to bendingly deform the inner panel along the lateral bead, is applied to the inner panel.

DESCRIPTION OF EMBODIMENTS

[First Embodiment]

A vehicle rear door structure relating to a first embodiment of the present invention is described by using FIG. 1 through FIG. 4. Note that arrow FR that is shown appropriately in these drawings indicates the vehicle front side, arrow UP indicates the vehicle upper side, and arrow W indicates the vehicle transverse direction. Further, a door transverse direction (door left-right direction) of a rear door 30 is the same direction as a vehicle transverse direction.

Figure 1:
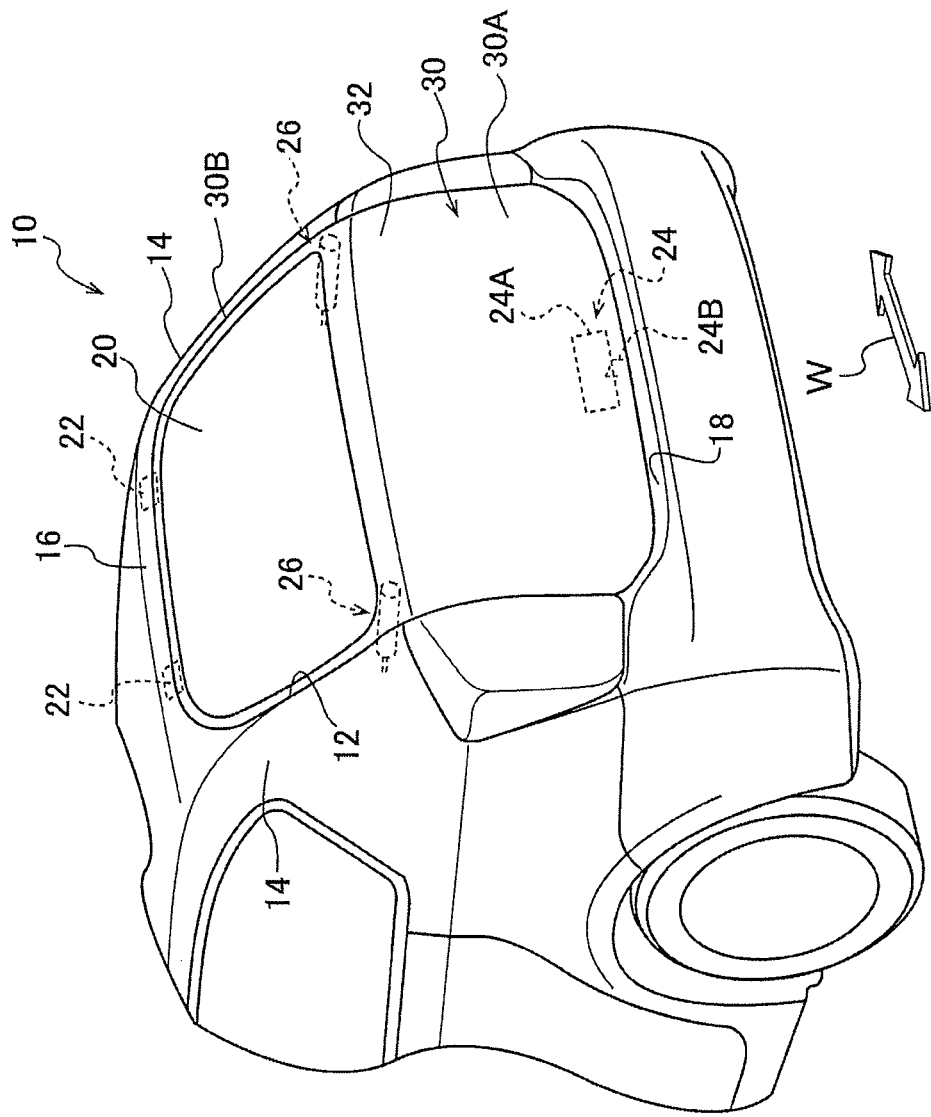
FIG. 1 is a perspective view showing a rear portion of an automobile to which a vehicle rear door structure relating to a first embodiment of the present invention is applied.

A vehicle rear portion 10 of an automobile, to which the vehicle rear door structure relating to the present invention is applied, is shown in a perspective view in FIG. 1. As shown in FIG. 1, a rear door opening portion 12 (also called "rear gate"), that opens toward the rear in the vehicle longitudinal direction, is formed in the vehicle rear portion 10, and the rear door 30 that is for opening and closing this rear door opening portion 12 is provided at the vehicle rear portion 10. Rear pillars 14 are provided erect at the both sides of the rear door opening portion 12. A rear roof header portion 16 is disposed substantially along the vehicle transverse direction at an upper edge side of the rear door opening portion 12, and a lower back portion 18 is disposed substantially along the vehicle transverse direction at a lower edge side of the rear door opening portion 12.

At the rear door 30, a lower portion of the door is made to be a rear door main body portion 30A, and an upper portion of the door is made to be a rear door frame portion 30B. A rear glass 20 (also called "rear door glass") is installed in the rear door frame portion 30B. An upper end portion of the rear door 30 is mounted to the rear roof header portion 16 of the vehicle body upper portion by door hinges 22. The door hinges 22 have hinge shafts (not shown) whose axial direction is along the vehicle transverse direction. The rear door opening portion 12 is opened and closed due to the rear door 30 being rotated and moves around the hinge shafts of the door hinges 22. Namely, the rear door 30 can move between a closed position (the state shown in FIG. 1), at which the rear door 30 closes the rear door opening portion 12, and an open position (not illustrated), at which the rear door 30 opens the rear door opening portion 12.

A vehicle transverse direction intermediate portion of the lower end portion of the rear door 30 is anchored to the vehicle body lower portion by a door lock mechanism 24. The door lock mechanism 24 has a lock mechanism portion 24A that is mounted to the rear door 30 side, and a striker 24B that is mounted to the lower back portion 18 side. The lock mechanism portion 24A can be anchored on the striker 24B. Due to the lock mechanism portion 24A being anchored on the striker 24B, the rear door 30 is maintained in a closed state.

Further, dampers 26 are mounted to both end portions in the vehicle transverse direction and intermediate portions in the vertical direction of the rear door 30. The pair of dampers 26 is structured by cylinders and pistons. The cylinders are mounted to both sides at upper end portion of the rear door main body portion 30A, and pistons are freely pulled-out and inserted-into the cylinders and are mounted to vertical direction intermediate portions at both side portions of the rear door opening portion 12. In the closed state of the rear door 30, the dampers 26 urge both end portions in the vehicle transverse direction at intermediate portions in the vertical direction of the rear door 30 substantially toward the vehicle rear side, and extend while rotating and moving in accordance with the degree of opening of the rear door 30. Further, due to the dampers 26 extending, the opening operation force of the rear door 30 is reduced, and the open state is maintained.

Figure 2:
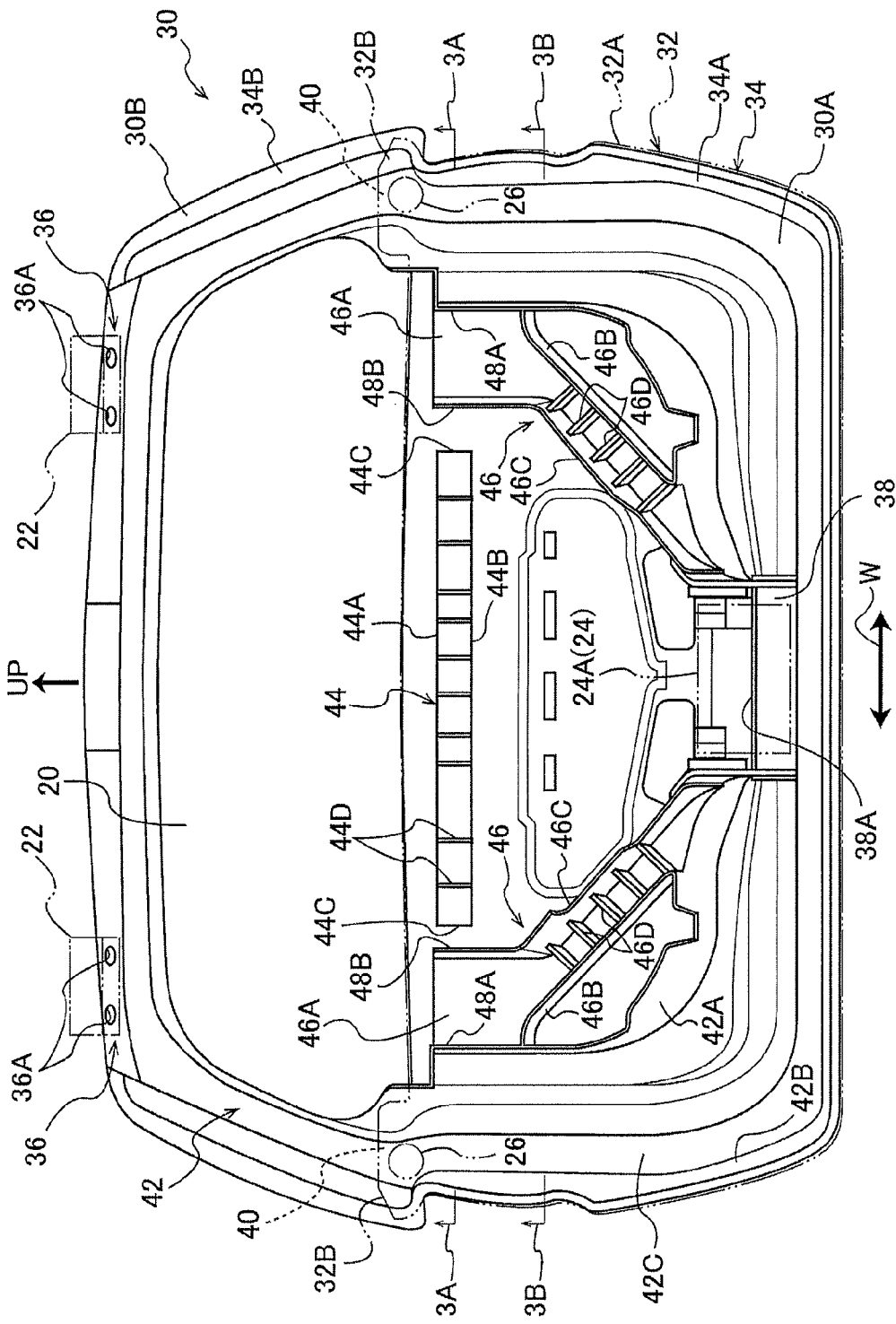
FIG. 2 is an elevation view showing a state in which the vehicle rear door structure relating to the first embodiment of the present invention is seen from a vehicle rear side, wherein a rear door outer panel is shown by a two-dot chain line and only the outer shape thereof is shown.
Figure 3A:
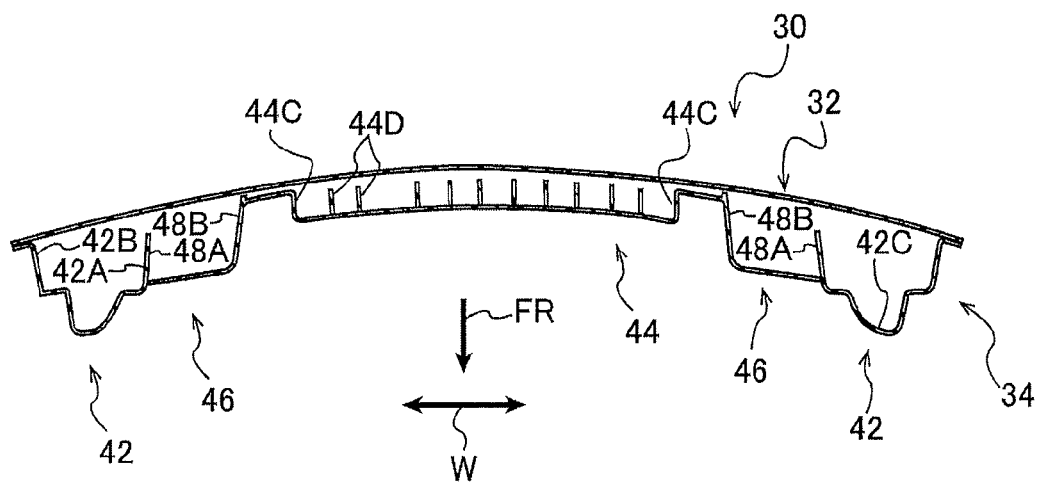
FIG. 3A is a horizontal sectional view showing, in a cross-section along line 3A-3A of FIG. 2, the vehicle rear door structure relating to the first embodiment of the present invention.
Figure 3B:
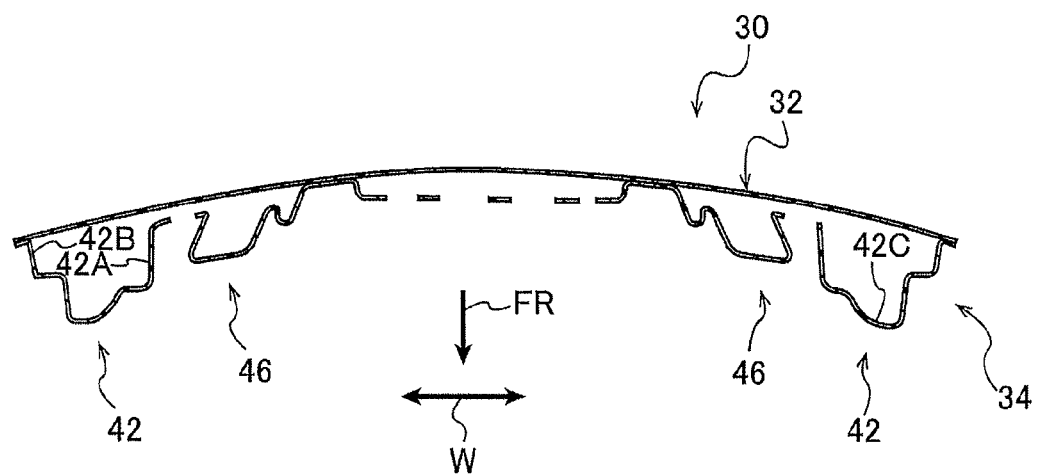
FIG. 3B is a horizontal sectional view showing, in a cross-section along line 3B-3B of FIG. 2, the vehicle rear door structure relating to the first embodiment of the present invention.

The vehicle rear door structure is shown in FIG. 2 in an elevation view that is viewed from the vehicle rear side. A cross-sectional view along line 3A-3A of FIG. 2 is shown in FIG. 3A, and a cross-sectional view along line 3B-3B of FIG. 2 is shown in FIG. 3B. As shown in these drawings, the rear door 30 is structured to include a rear door outer panel 32 that serves as an outer panel and is disposed at the door outer side, and a rear door inner panel 34 that serves as an inner panel and is disposed at the door inner side. Note that, in FIG. 2, the rear door outer panel 32 is illustrated by the two-dot chain line and only the outer shape thereof is shown, and the rear door inner panel 34 is illustrated in a state of seeing-through the rear door outer panel 32.

In the present embodiment, the rear door outer panel 32 and the rear door inner panel 34 are both made of resin, and are disposed so as to face one another and are joined together. As shown in FIG. 2, the rear door outer panel 32 has a rear door outer panel main body portion 32A that structures the outer plate of the rear door main body portion 30A, and extending pieces 32B that extend from the rear door outer panel main body portion 32A and are disposed at a lower end portion of the rear door frame portion 30B. In contrast, the rear door inner panel 34 has a rear door inner panel main body portion 34A that structures the inner plate of the rear door main body portion 30A, and a rear door inner panel frame portion 34B that structures the rear door frame portion 30B. Outer peripheral edge portions of the rear door inner panel main body portion 34A and the rear door outer panel main body portion 32A are joined together by an adhesive such as mastic or the like, and the rear door inner panel main body portion 34A and the rear door outer panel main body portion 32A structure the rear door main body portion 30A that has a closed cross-sectional structure.

At an upper end portion of the rear door inner panel 34 (the rear door inner panel frame portion 34B), regions that are toward both end portions in the vehicle transverse direction are made to be door hinge mounting portions 36. Bolt insert-through holes 36A are formed in the door hinge mounting portions 36. The door hinges 22 are fastened to the rear door inner panel 34 by bolts (not illustrated) or the like that are inserted-through the bolt insert-through holes 36A.

In contrast, a lock mechanism placement portion 38 in which the lock mechanism portion 24A is placed is formed at the vehicle transverse direction intermediate portion of the lower end portion of the rear door inner panel 34 (the rear door inner panel main body portion 34A). A hole 38A for wires is formed in this lock mechanism placement portion 38.

Damper mounting portions 40 are provided at a surface that faces toward a vehicle cabin inner side (the surface at a side opposite a surface shown in FIG. 2), at the vehicle transverse direction both end portions at intermediate portions in the vertical direction of the rear door inner panel 34. The dampers 26 (see FIG. 1) are mounted to the damper mounting portions 40.

An annular bead 42 is formed at the rear door inner panel 34 so as to circle an outer peripheral portion thereof. The annular bead 42 is formed in a concave shape at the door outer side (a convex shape toward the vehicle cabin inner side) (see FIG. 3), and has an inner peripheral wall portion 42A that serves as a wall portion at an inner peripheral side, and has an outer peripheral wall portion 42B that serves as a wall portion at an outer peripheral side. Note that, at the annular bead 42, several step-shaped height differences (step portions) in the door thickness direction (the direction orthogonal to the surface of the drawing of FIG. 2) are provided at a bottom wall portion 42C that connects the inner peripheral wall portion 42A with the outer peripheral wall portion 42B (see FIG. 3). Ridgelines of these step portions also are illustrated in FIG. 2.

Further, a lateral bead 44 that extends in the vehicle transverse direction is formed at a lower side of the rear glass 20 at the vertical direction intermediate portion of the rear door inner panel 34. The lateral bead 44 is formed in a concave shape at the door outer side (a convex shape toward the vehicle cabin inner side) (see FIG. 3A), and has an upper wall portion 44A that structures a region at the upper side, a lower wall portion 44B that structures a region at the lower side, and lateral wall portions 44C that structure the vehicle transverse direction outer side end portions. Further, the lateral wall portions 44C are disposed at positions that are apart from the inner peripheral wall portion 42A of the annular bead 42.

Plural ribs 44D, that, as seen in a door elevation view, extend in a direction (the vertical direction in FIG. 2) that is orthogonal to the direction in which the lateral bead 44 extends, are formed at the lateral bead 44. The ribs 44D are provided within a recess of the lateral bead 44, and connect the upper wall portion 44A with the lower wall portion 44B.

Further, a pair of connecting beads 46, that connect regions that are positioned at vehicle transverse direction outer sides with respect to the lateral bead 44 with the lock mechanism placement portion 38 (the region where the lock mechanism portion 24A of the door lock mechanism 24 is placed), are formed at the rear door inner panel 34. At the connecting beads 46, upper end portions 46A, that are positioned at vehicle transverse direction outer sides with respect to the lateral bead 44, are disposed at positions that are apart from the lateral bead 44, and are connected to the annular bead 42. Regions where no bead is provided exist at positions at extended location from the lateral bead 44 between the lateral bead 44 and the connecting beads 46 at the rear door inner panel 34. The regions contribute to the fitting rigidity of the rear door 30.

The pair of connecting beads 46 are formed in concave shapes at the door outer side (convex shapes toward the vehicle cabin inner side) (see FIG. 3), and have first wall portions 46B that serve as side portions at the vehicle transverse direction outer sides, and second wall portions 46C that serve as side portions at the vehicle transverse direction inner sides. As seen in a door elevation view, upper portions of the first wall portions 46B and the second wall portions 46C extend in the vertical direction, and the intermediate portions and lower portions in the vertical direction are inclined downward approximately toward the vehicle transverse direction inner sides.

Further, the connecting bead 46 has an outer side wall portion 48A that serves as a side wall portion forming a portion of the first wall portion 46B and is made to be the side portion at the vehicle transverse direction outer side of the upper end portion 46A, and an inner side wall portion 48B that serves as a side wall portion forming a portion of the second wall portion 46C and is made to be the side portion at the vehicle transverse direction inner side of the upper end portion 46A. The outer side wall portion 48A and the inner side wall portion 48B both stand erect in the door thickness direction of the rear door 30, and both extend in the direction orthogonal to the extension line of the lateral bead 44 (an imaginary straight line that extends in the direction of the extended positions, in the vehicle transverse direction, of the lateral bead 44) as seen in a door elevation view, i.e., extend in the vertical direction as seen in a door elevation view. Further, the outer side wall portion 48A is made integral with the inner peripheral wall portion 42A (the wall portion at the inner peripheral side) of the annular bead 42 (see FIG. 3A).

Plural ribs 46D, that extend in the direction orthogonal to the direction in which the connecting bead 46 extends as seen in a door elevation view, are formed at the connecting bead 46. The ribs 46D are provided within a recess of the connecting bead 46 and connect a first wall portion 46B with a second wall portion 46C.

Note that regions of the rear door inner panel 34, other than the annular bead 42, the lateral bead 44 and the connecting beads 46 that are formed in concave shapes in cross-section, are disposed so as to be approximately adjacent to the rear door outer panel 32, as is partially shown also in the horizontal sectional views of FIG. 3A and FIG. 3B.

(Operation/Effects)

The operation and effects of the above-described embodiment are described next.

As shown in FIG. 2, in the vehicle rear door structure relating to the present embodiment, at the rear door inner panel 34 that structures the rear door 30, the annular bead 42 is formed so as to circle the outer peripheral portion of the rear door inner panel 34, and the lateral bead 44 that extends in the vehicle transverse direction is formed at the vertical direction intermediate portion. Therefore, the overall torsional rigidity of the rear door 30 is improved by these beads 42 and 44, and the door operability at times of opening and closing the rear door 30 is good.

Further, at the rear door 30, the upper end portion is mounted to the vehicle upper portion by the door hinges 22, and the vehicle transverse direction intermediate portion of the lower end portion is anchored on the vehicle body lower portion by the door lock mechanism 24, and, in the closed state, the vehicle transverse direction both end portions at the vertical direction intermediate portion of the rear door 30 are urged substantially toward the vehicle rear side by the dampers 26. Therefore, in the state in which the rear door 30 is closed, force, that attempts to bendingly deform the rear door inner panel 34 in a sideways V-shape as seen in a vehicle side view, is applied to the rear door inner panel 34 that structures the rear door 30.

With respect to this force, at the rear door inner panel 34, the lateral wall portions 44C, that are the vehicle transverse direction outer side end portions of the lateral bead 44, are disposed at positions that are apart from the annular bead 42, and the upper end portions 46A of the connecting beads 46, that are positioned at the vehicle transverse direction outer sides with respect to the lateral bead 44, are disposed at positions that are apart from the lateral bead 44. Therefore, although the lateral bead 44 is formed, bending deformation with the lateral bead 44 being the starting point of the bending is not promoted. Namely, in the closed state of the rear door 30, the regions having no bead at the extended positions from the lateral bead 44 between the lateral bead 44 and the connecting beads 46 contribute to the fitting rigidity of the rear door 30.

Further, the connecting beads 46 connect the lock mechanism placement portion 38 with the regions that are positioned at the vehicle transverse direction outer sides with respect to the lateral bead 44, and the outer side wall portions 48A and the inner side wall portions 48B, that serve as the side portions of the upper end portions 46A of the connecting beads 46, stand erect in the door thickness direction of the rear door 30. Therefore, the overall torsional rigidity of the rear door 30 improves, and, even if force that attempts to bendingly deform the rear door inner panel 34 along the lateral bead 44 is applied to the rear door inner panel 34, sectional collapsing of the upper end portions 46A of the connecting beads 46 is suppressed, and bending deformation along the lateral bead 44 of the rear door inner panel 34 is effectively suppressed.

Here, to describe this more concretely by focusing on application to the upper end portion 46A of the connecting bead 46, the outer side wall portion 48A and the inner-side side wall portion 48B that are formed at the upper end portion 46A of the connecting bead 46 extend in a direction orthogonal to the extension line of the lateral bead 44 as seen in a door elevation view. Therefore, when force that attempts to bendingly deform the rear door inner panel 34 along the lateral bead 44 is applied to the rear door inner panel 34, the outer side wall portion 48A and the inner-side side wall portion 48B can receive the inputted load in their extending direction. Due thereto, collapsing-in of the outer side wall portion 48A and the inner side wall portion 48B (in other words, sectional collapsing of the upper end portion 46A of the connecting bead 46) is suppressed more effectively. Accordingly, bending deformation of the rear door inner panel 34 is effectively suppressed by the outer side wall portion 48A and the inner side wall portion 48B of the upper end portion 46A of the connecting bead 46.

Further, the outer side wall portion 48A and the inner side wall portion 48B are formed as a pair at the side portions at the vehicle transverse direction both sides of the upper end portion 46A of the connecting bead 46. Therefore, the upper end portion 46A of the connecting bead 46 can receive the inputted load at the outer side wall portion 48A and the inner side wall portion 48B that are a pair, and not only at a side wall portion at one side in the vehicle transverse direction (one of the outer side wall portion 48A and the inner side wall portion 48B).

Further, the upper end portion 46A of the connecting bead 46 is disposed at a position that is apart from the lateral bead 44, and is connected to the annular bead 42. Therefore, some of the load that is applied to the connecting bead 46 is shared by the annular bead 42. Further, the outer side wall portion 48A, that stands erect in the door thickness direction of the rear door 30 at the vehicle transverse direction outer side of the upper end portion 46A, is made integral with the inner peripheral wall portion 42A of the annular bead 42. Therefore, when force, that attempts to bendingly deform the rear door inner panel 34 along the lateral bead 44, is applied to the rear door inner panel 34, bending deformation of the rear door inner panel 34 is suppressed effectively as compared with a structure that, for example, does not have a wall portion corresponding to the outer side wall portion 48.

Moreover, the ribs 46D, that extend in a direction orthogonal to the direction in which the connecting bead 46 extends as seen in a door elevation view, are formed at the connecting bead 46. Therefore, when load is applied to the connecting bead 46, it is even more difficult for sectional collapsing of the connecting bead 46 to occur. Therefore, the reinforcing effect by the connecting bead 46 is exhibited properly.

For these reasons, even if the lower end portion of the rear door 30 is locked to the vehicle body lower portion at a position at which the amount by which the lower end portion of the rear door 30 is pulled-in toward the vehicle front side is suppressed, positional offset of the lower end portion of the rear door 30 in the vehicle longitudinal direction is suppressed, and the fitting of the rear door 30 is realized well.

Figure 4A:
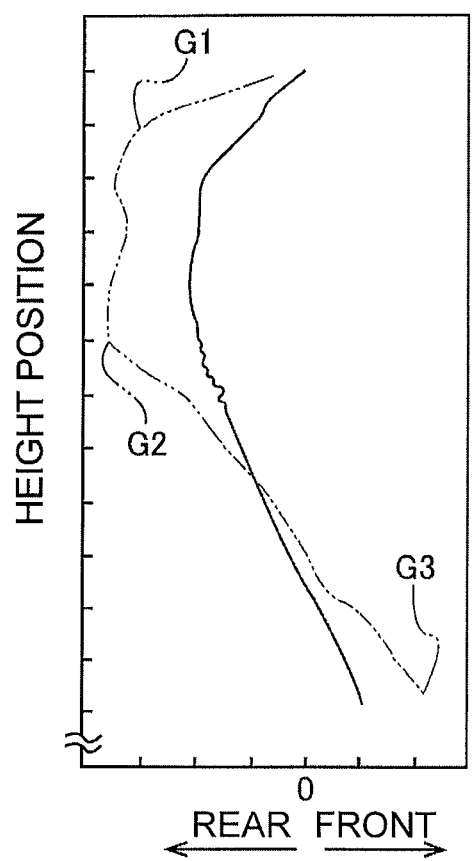
FIG. 4A is a graph that compares the fitted states of a comparative structure and the vehicle rear door structure relating to the first embodiment of the present invention, wherein displacement amount in a vehicle longitudinal direction is shown on the horizontal axis.
Figure 4B:
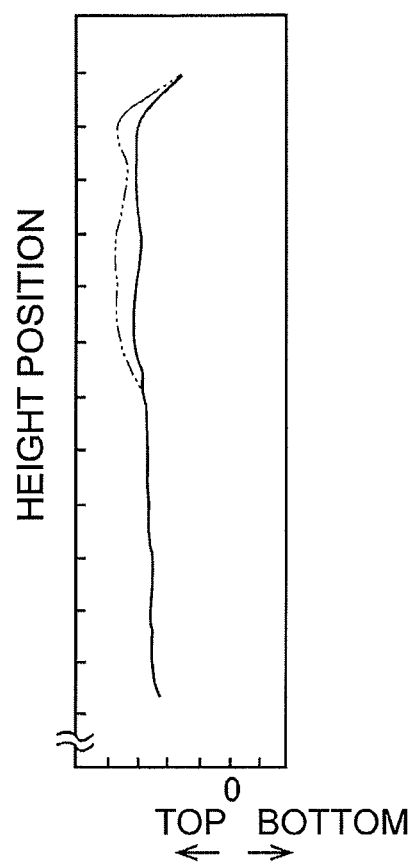
FIG. 4B is a graph that compares the fitted states of the comparative structure and the vehicle rear door structure relating to the first embodiment of the present invention, wherein displacement amount in the vehicle vertical direction is shown on the horizontal axis.

Further supplementary explanation is given here with reference to the graphs of FIGS. 4A and 4B. The graphs shown in FIG. 4A and FIG. 4B show, with respect to a reference position in a case in which an assembly, that is structured by the rear door outer panel, the rear door inner panel and the rear glass, is mounted to the vehicle body rear portion by the door hinges and the door lock mechanism, how much the position is displaced in a case in which the above-described assembly is fully equipped with interior parts and the dampers and the like and the rear door is closed.

The height position in the vehicle vertical direction is shown along the vertical axis in FIG. 4A and FIG. 4B. In contrast, the displacement amount (offset amount) in the vehicle longitudinal direction is shown on the horizontal axis in FIG. 4A, and the displacement amount (offset amount) in the vehicle vertical direction is shown on the horizontal axis in FIG. 4B.

Further, the solid lines in the graphs show results of the rear door 30 that is made of resin and to which the vehicle rear door structure relating to the present embodiment is applied, and the two-dot chain lines in the graphs show the results of a rear door that is made of resin and to which a comparative structure is applied. In this comparative structure, the connecting beads 46 of the vehicle rear door structure relating to the present embodiment are not provided, and the both end portions of a bead that corresponds to the lateral bead 44 are connected to a bead that corresponds to the annular bead 42. Note that, with regard to other points, this comparative structure is similar to vehicle rear door structure relating to the present embodiment.

As shown in FIG. 4A, in the rear door of the comparative structure (refer to the two-dot chain line), an upper side region G1 and an intermediate region G2 in the vertical direction are bent, and the rear door is deformed in a convex shape toward the vehicle rear direction side. In other words, so-called "two-stage bending", in which there is bending at the upper side region G1 and the intermediate region G2 in the vertical direction, occurs markedly. In contrast, at the rear door 30 to which the vehicle rear door structure relating to the present embodiment is applied, as shown by the solid line in the graph, the amount of displacement toward the vehicle rear side and so-called "two-stage bending" are suppressed. Note that, in the rear door of the comparative structure (refer to the two-dot chain line), the upper side region G1 (the bent region at the upper side) is a region corresponding to the door hinge mounting portions (36), and the intermediate region G2 in the vertical direction (the bent region at the intermediate region in the vertical direction) is a region corresponding to the damper mounting portions (40).

Further, at the rear door of the comparative structure (refer to the two-dot chain line), in order to suppress poor fitting that is caused by insufficient rigidity, the amount by which a door lower end portion G3 is pulled-in toward the vehicle front side is set to be large. In other words, in the case of the rear door of the comparative structure (refer to the two-dot chain line), when the amount by which the door lower end portion G3 is pulled-in toward the vehicle front side is suppressed, poor fitting that is caused by insufficient rigidity arises, and therefore, the door lower end portion G3 must be locked in a state of being pulled-in greatly toward the vehicle front side. Further, when the amount by which the door lower end portion G3 is pulled-in is great in this way, the force that is applied to the intermediate region G2 in the vertical direction, that corresponds to the damper mounting portions (40), also is great, and therefore, it is easy for the rear door to deform in so-called "two-stage bending". In contrast, at the rear door 30 to which the vehicle rear door structure relating to the present embodiment is applied, because the rigidity is high as compared with the comparative structure, the fitting of the rear door 30 is realized well even if the lower end portion of the rear door 30 is locked to the vehicle body lower portion with the suppressed amount by which the lower end portion of the rear door 30 is pulled-in toward the vehicle front side. Accordingly, this is advantageous in suppressing so-called "two-stage bending" of the rear door 30.

Note that, as shown in FIG. 4B, with regard to the amount of displacement in the vehicle vertical direction as well, the amount of displacement can be suppressed more in the case of the present embodiment (refer to the solid line) than in the case of the comparative structure (refer to the two-dot chain line).

As described above, in accordance with the vehicle rear door structure relating to the present embodiment, the fitting performance of the rear door 30 that is shown in FIG. 1 can be improved. Namely, when the rear door 30 is shut, the rear door 30 is held precisely at the predetermined fitting position.

Note that, in the vehicle rear door structure relating to the present embodiment, because the rigidity of the rear door inner panel 34 shown in FIG. 2 is increased, even if the rear door inner panel 34 is not reinforced separately by a lock reinforcement or the like, mounting and processing of members to the rear door inner panel 34 and the additional formation of hole portions (work holes or mass reducing holes) in the rear door inner panel 34 are possible. In other words, it is easy to improve the marketability of the rear door 30. Further, in the vehicle rear door structure relating to the present embodiment, the mass and cost are suppressed as compared with a structure in which the rear door inner panel is reinforced separately by a lock reinforcement or the like.

[Second Embodiment]

Figure 5A:
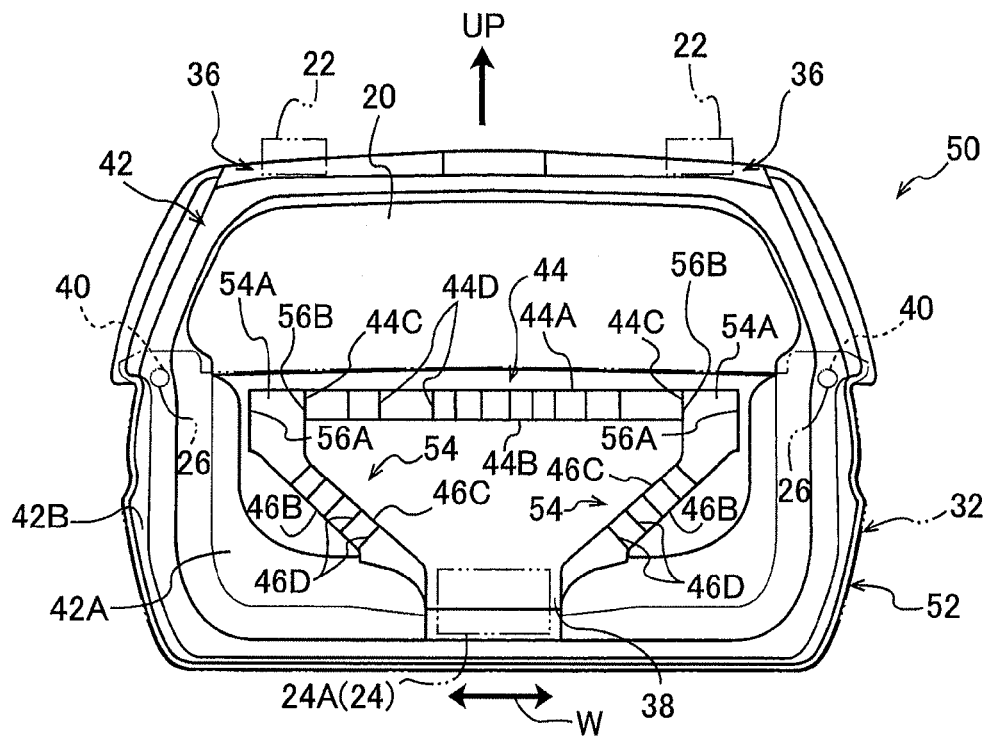
FIG. 5A is an elevation view showing a vehicle rear door structure relating to a second embodiment of the present invention.

A vehicle rear door structure relating to a second embodiment of the present invention is described next by using FIG. 5A. A rear door 50, to which the vehicle rear door structure relating to the second embodiment of the present invention is applied, is shown in FIG. 5A in a schematic elevation view. As shown in this drawing, at the rear door 50, connecting beads 54 that are formed at a rear door inner panel 52 differ from the connecting beads 46 relating to the first embodiment (see FIG. 2) with regard to the point that upper end portions 54A, that are positioned at the vehicle transverse direction outer sides with respect to the lateral bead 44, are disposed at positions apart from the annular bead 42 and are connected to the lateral bead 44. The other structures (including the other structural portions of the connecting beads 54) are substantially the same structures as in the first embodiment. Accordingly, structural portions that are substantially similar to those of the first embodiment are denoted by the same reference numerals and description thereof is omitted.

As shown in FIG. 5A, the connecting bead 54 has an outer side wall portion 56A and an inner side wall portion 56B. The outer side wall portion 56A serves as a side wall portion that structures a portion of the first wall portion 46B and is made to be the side portion at the vehicle transverse direction outer side of the upper end portion 54A. The inner side wall portion 56B serves as a side wall portion that structures a portion of the second wall portion 46C and is made to be the side portion at the vehicle transverse direction inner side of the upper end portion 54A. The outer side wall portion 56A and the inner side wall portion 56B both stand erect in the door thickness direction of the rear door 50, and both extend in a direction orthogonal to the extension line of the lateral bead 44 in a door elevation view, i.e., extend in the vertical direction in a door elevation view. Further, the inner side wall portion 56B is made integral with the lateral wall portion 44C of the lateral bead 44.

In accordance with the structure of the above-described present embodiment as well, the fitting performance of the rear door 50 can be improved. Further, in the present embodiment, when force, that attempts to bendingly deform the rear door inner panel 52 along the lateral bead 44, is applied to the rear door inner panel 52, bending deformation of the rear door inner panel 52 is suppressed as compared with, for example, a structure that does not have a wall portion corresponding to the inner-side side wall portion 56B.

[Third Embodiment]

Figure 5B:
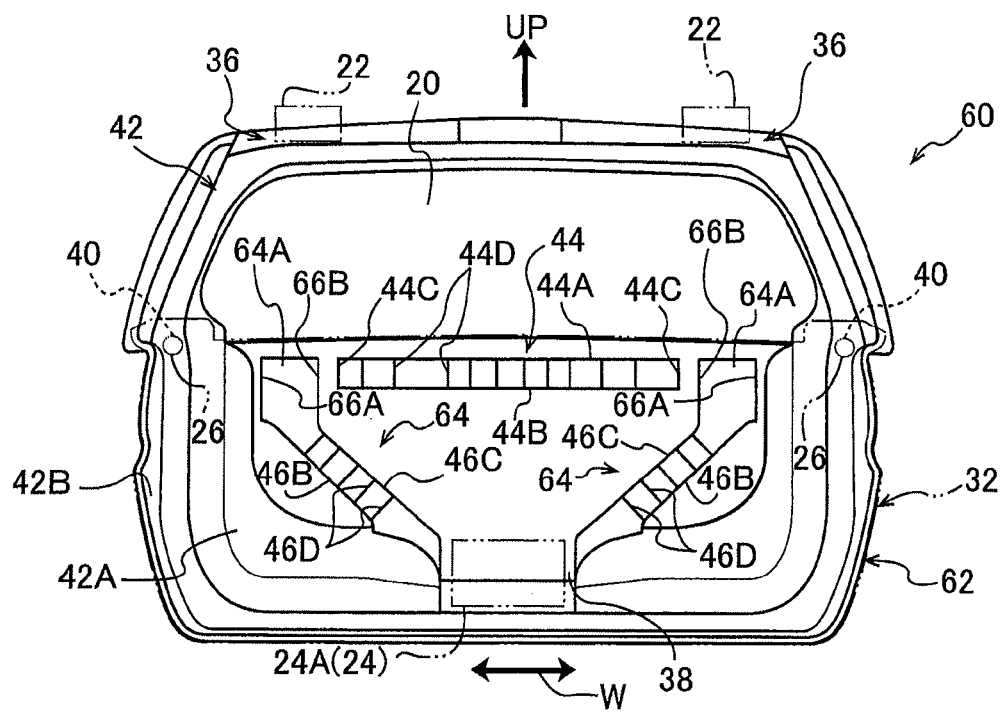
FIG. 5B is an elevation view showing a vehicle rear door structure relating to a third embodiment of the present invention.

A vehicle rear door structure relating to a third embodiment of the present invention is described next by using FIG. 5B. A rear door 60, to which the vehicle rear door structure relating to the third embodiment of the present invention is applied, is shown in FIG. 5B in a schematic elevation view. As shown in this drawing, at the rear door 60, connecting beads 64 that are formed at a rear door inner panel 62 differ from the connecting beads 46 relating to the first embodiment (see FIG. 2) with regard to the point that upper end portions 64A, that are positioned at the vehicle transverse direction outer sides with respect to the lateral bead 44, are disposed at positions that are apart from both the lateral bead 44 and the annular bead 42. The other structures (including the other structural portions of the connecting beads 64) are substantially the same structures as in the first embodiment. Accordingly, structural portions that are substantially similar to those of the first embodiment are denoted by the same reference numerals and description thereof is omitted.

As shown in FIG. 5B, the connecting bead 64 has an outer side wall portion 66A and an inner side wall portion 66B. The outer side wall portion 66A serves as a side wall portion that structures a portion of the first wall portion 46B and is made to be the side portion at the vehicle transverse direction outer side of the upper end portion 64A. The inner side wall portion 66B serves as a side wall portion that structures a portion of the second wall portion 46C and is made to be the side portion at the vehicle transverse direction inner side of the upper end portion 64A. The outer side wall portion 66A and the inner side wall portion 66B both stand erect in the door thickness direction of the rear door 60, and both extend in a direction orthogonal to the extension line of the lateral bead 44 in a door elevation view, i.e., extend in the vertical direction in a door elevation view.

In accordance with the structure of the above-described present embodiment as well, the fitting performance of the rear door 60 can be improved.

[Supplementary Description of Embodiments]

Note that, as modified examples of the above-described first through third embodiments, for example, a structure in which the inner side wall portions 48B, 56B, 66B are not formed at the upper end portions 46A, 54A, 64A of the connecting beads 46, 54, 64 and only the outer side wall portions 48A, 56A, 66A are formed, and a structure in which the outer side wall portions 48A, 56A, 66A are not formed at the upper end portions 46A, 54A, 64A of the connecting beads 46, 54, 64 and only the inner side wall portions 48B, 56B, 66B are formed, also are possible.

Further, as modified examples of the above-described first through third embodiments, for example, a structure in which at least one of the outer side wall portions 48A, 56A, 66A and the inner side wall portions 48B, 56B, 66B at the upper end portions 46A, 54A, 64A of the connecting beads 46, 54, 64 extend in a direction that obliquely intersects the extension line of the lateral bead 44 in a door elevation view (a direction that is inclined toward the lower side while heading toward the vehicle transverse direction inner side in a door elevation view) also is possible.

Further, in the above-described first through third embodiments, the ribs 46D are formed at the connecting beads 46, 54, 64, but a structure in which these ribs 46D are not formed also is possible. Similarly, a structure in which the ribs 44D of the lateral bead 44 are not formed also is possible. Further, ribs, that extend in a direction orthogonal to the direction in which the annular bead 42 extends in a door elevation view, may be formed within the recess of the annular bead 42.

Further, although the rear door inner panels 34, 52, 62 are formed of resin in the above-described embodiments, the present invention may be applied to a metal inner panel.

Further, the concept of "standing erect in the door thickness direction of the rear door" in the vehicle rear door structures relating to the first aspect and second aspect of the present invention includes, in addition to cases of standing erect in a direction that perfectly coincides with the door thickness direction of the rear door, also cases that can be interpreted as standing erect substantially in the door thickness direction of the rear door. Namely, such a case is included in the above concept as standing erect in a direction that runs substantially, not strictly standing erect, along the door thickness direction of the rear door and obtaining operation and effects that are substantially similar to a case of standing erect in a direction that perfectly coincides with the door thickness direction of the rear door, as in the above-described embodiments.

Further, the concept of "the direction orthogonal to the extension line of the lateral bead" in the vehicle rear door structure relating to the third aspect of the present invention includes, in addition to the direction perfectly orthogonal to the extension line of the lateral bead 44 as in the above-described embodiments, also directions that cannot be said to be directions that are perfectly orthogonal to the extension line of the lateral bead. Namely, such directions can be interpreted as being directions that are substantially orthogonal to the extension line of the lateral bead and at which operation and effects, that are substantially similar to the case of being the direction perfectly orthogonal to the extension line of the lateral bead, are obtained.

Further, the concept of "the direction orthogonal to the direction in which the connecting beads extend" in the vehicle rear door structure relating to the fifth aspect of the present invention includes, in addition to the direction perfectly orthogonal to the direction in which the connecting beads 46, 54, 64 extend as in the above-described embodiments, also directions that cannot be said to be directions that are perfectly orthogonal to the direction in which the connecting beads extend. Such directions can be interpreted as being directions that are substantially orthogonal to the direction in which the connecting beads extend and at which operation and effects, that are substantially similar to the case of being the direction perfectly orthogonal to the direction in which the connecting beads extend, are obtained.

Note that the above-described embodiments and plural modified examples can be implemented by being combined appropriately.

Note that the disclosure of Japanese Patent No. 2011-168832 is, in its entirety, incorporated by reference into the present Description.

The invention claimed is:

1. A vehicle rear door structure comprising:
a rear door that opens and closes a rear door opening portion of a vehicle rear portion, and that is structured to include an outer panel and an inner panel that are disposed so as to face one another and are joined together, an upper end portion of the rear door being mounted to a vehicle body upper portion by door hinges, an intermediate portion in a vehicle transverse direction of a lower end portion of the rear door being anchored to a vehicle body lower portion by a door lock mechanism, and, in a closed state, both end portions in the vehicle transverse direction of a vertical direction intermediate portion of the rear door is configured to be urged substantially toward a vehicle rear side such that the intermediate portion is positioned further to the vehicle rear side than the upper end portion and the lower end portion of the rear door by dampers respectively having a piston and a cylinder and being extendable toward the vehicle rear side;

wherein the inner panel comprises:
an annular bead provided so as to circle an outer peripheral portion of the inner panel;
a lateral bead that is provided at an intermediate portion in a vertical direction of the inner panel and extends in the vehicle transverse direction, and whose outer side end portions in the vehicle transverse direction are disposed at positions that are apart from the annular bead; and
connecting beads that are linked to portions that are located at the inner panel and are positioned at outer sides in the vehicle transverse direction with respect to the lateral bead, and a portion at which the door lock mechanism is disposed, upper end portions of the connecting beads, that are positioned at outer sides in the vehicle transverse direction with respect to the lateral bead, being disposed at positions that are apart from at least one of the lateral bead or the annular bead, and the connecting beads having side wall portions that stand erect in a door thickness direction of the rear door at side portions of the upper end portions.

2. The vehicle rear door structure of claim 1, wherein the upper end portions of the connecting beads are disposed at positions that are apart from the lateral bead, and the upper end portions have outer side wall portions that are connected to the annular bead, serve as the side wall portions, and stand erect in the door thickness direction of the rear door at outer side portions in the vehicle transverse direction of the upper end portions of the connecting beads, and the outer side wall portions are made integral with a wall portion of an inner peripheral side of the annular bead.

3. The vehicle rear door structure of claim 2, wherein the side wall portions extend substantially in the vertical direction.

4. The vehicle rear door structure of claim 3, wherein the side wall portions are formed at both side portions in the vehicle transverse direction of the respective upper end portions of the connecting beads.

5. The vehicle rear door structure of claim 4, wherein ribs, that extend in a direction orthogonal to wall portion of the connecting beads, are formed at the connecting beads, wherein the wall portions link the portions of the inner panel positioned at outer sides in the vehicle transverse direction with respect to the lateral bead and the portions of the inner panel at which the door lock mechanism is disposed.

6. The vehicle rear door structure of claim 3, wherein ribs, that extend in a direction orthogonal to wall portions of the connecting beads, are formed at the connecting beads, wherein the wall portions link the portions of the inner panel positioned at outer sides in the vehicle transverse direction with respect to the lateral bead and the portions of the inner panel at which the door lock mechanism is disposed.

7. The vehicle rear door structure of claim 2, wherein the side wall portions are formed at both side portions in the vehicle transverse direction of the respective upper end portions of the connecting beads.

8. The vehicle rear door structure of claim 7, wherein ribs, that extend in a direction orthogonal to wall portions of the connecting beads, are formed at the connecting beads, wherein the wall portions link the portions of the inner positioned at outer sides in the vehicle transverse direction with respect to the lateral bead and the portions of the inner panel at which the door lock mechanism is disposed.

9. The vehicle rear door structure of claim 2, wherein ribs, that extend in a direction orthogonal to wall portions of the connecting beads, are formed at the connecting beads, wherein the wall portions link the portions of the inner panel positioned at outer sides in the vehicle transverse direction with respect to the lateral bead and the portions of the inner panel at which the door lock mechanism is disposed.

10. The vehicle rear door structure of claim 1, wherein the side wall portions extend substantially in the vertical direction.

11. The vehicle rear door structure of claim 10, wherein the side wall portions are formed at both side portions in the vehicle transverse direction of the respective upper end portions of the connecting beads.

12. The vehicle rear door structure of claim 10, wherein ribs, that extend in a direction orthogonal to wall portions of the connecting beads, are formed at the connecting beads, wherein the wall portions link the portions of the inner panel positioned at outer sides in the vehicle transverse direction with respect to the lateral bead and the portions of the inner panel at which the door lock mechanism is disposed.

13. The vehicle rear door structure of claim 11, wherein ribs, that extend in a direction orthogonal to wall portions of the connecting beads, are formed at the connecting beads, wherein the wall portions link the portions of the inner panel positioned at outer sides in the vehicle transverse direction with respect to the lateral bead and the portions of the inner panel at which the door mechanism is disposed.

14. The vehicle rear door structure of claim 1, wherein the side wall portions are formed at both side portions in the vehicle transverse direction of the respective upper end portions of the connecting beads.

15. The vehicle rear door structure of claim 14, wherein ribs, that extend in a direction orthogonal to wall portions of the connecting beads, are formed at the connecting beads, wherein the wall portions link the portions of the inner panel positioned at outer sides in the vehicle transverse direction with respect to the lateral bead and the portions of the inner panel at which the door lock mechanism is disposed.

16. The vehicle rear door structure of claim 1, wherein ribs, that extend in a direction orthogonal wall portions of the connecting beads, are formed at the connecting beads, wherein the wall portions link the portions of the inner panel positioned at outer sides in the vehicle transverse direction with the respect to the lateral bead and the portions of the inner panel at which the door lock mechanism is disposed.

17. The vehicle rear door structure of claim 1, wherein the upper end portions of the connecting beads are disposed at positions that are apart from the annular bead, and the upper end portions have inner side wall portions that are connected to the lateral bead, serve as the side wall portions, and stand erect in the door thickness direction of the rear door at inner side portions in the vehicle transverse direction of the upper end portions of the connecting beads, and the inner side wall portions are made integral with a wall portion of an outer peripheral side of the lateral bead.

18. The vehicle rear door structure of claim 1, wherein the upper end portions of the connecting beads are disposed at positions that are apart from the annular bead and the lateral bead, and the upper end portions have outer side wall portions and inner side wall portions that serve as the side wall portions, and that stand erect in the door thickness direction of the rear door.

* * * * *